Oct. 16, 1923. 1,471,057
G. E. PHILLIPS
MANUFACTURE OF FLEXIBLE METALLIC TUBING, ARMORED CABLE, AND LIKE PRODUCTS
Filed March 14, 1922 2 Sheets-Sheet 1
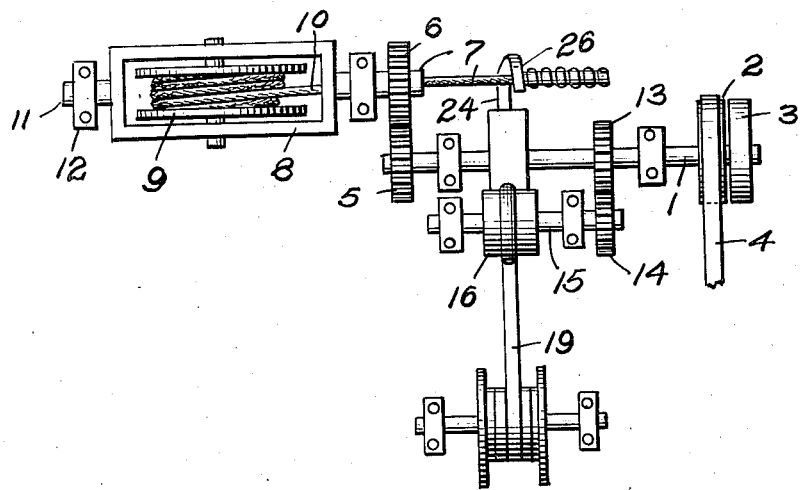
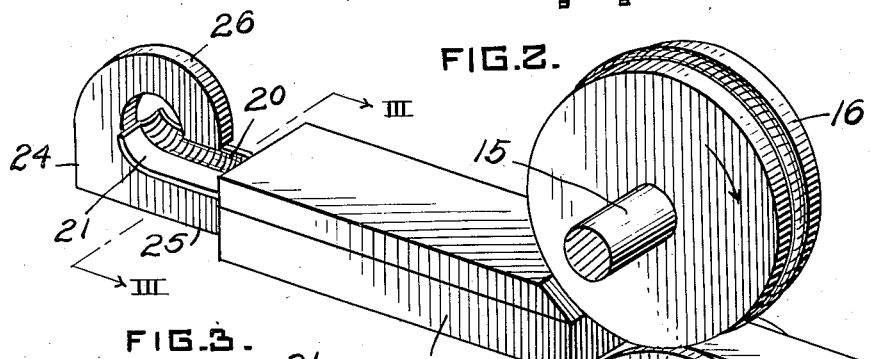
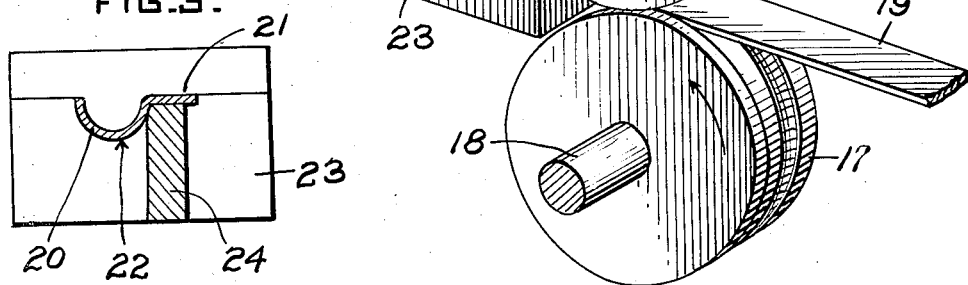
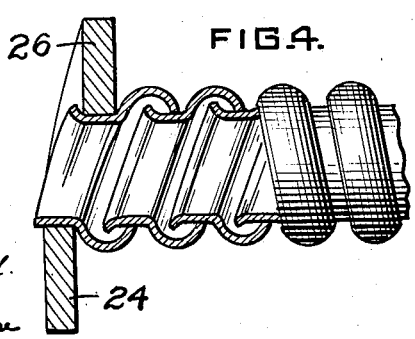
WITNESSES
INVENTOR
George E. Phillips,
by Christy & Christy,
Attys.

Oct. 16, 1923.
G. E. PHILLIPS
1,471,057
MANUFACTURE OF FLEXIBLE METALLIC TUBING, ARMORED CABLE, AND LIKE PRODUCTS
Filed March 14, 1922    2 Sheets-Sheet 2
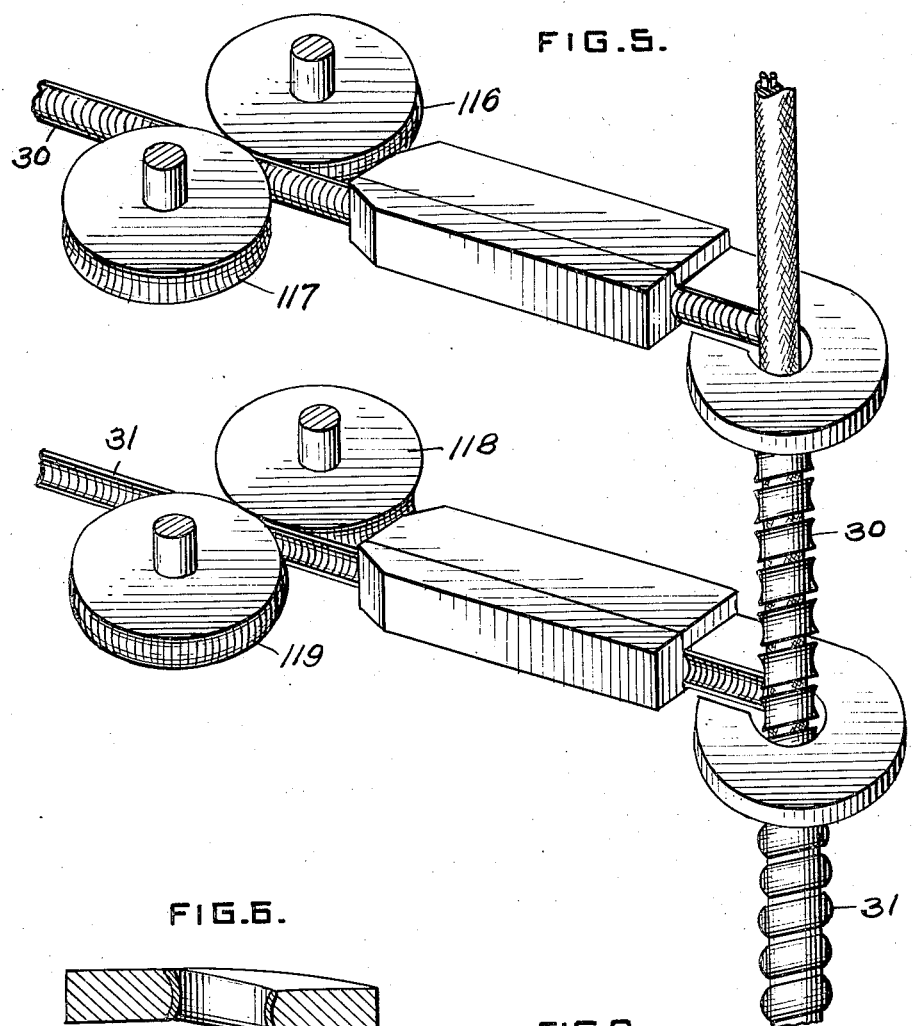
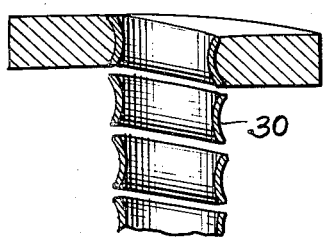
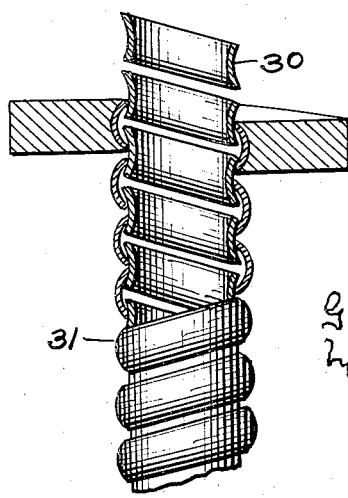
WITNESSES
INVENTOR Patented Oct. 16, 1923.

1,471,057

UNITED STATES PATENT OFFICE.

GEORGE E. PHILLIPS, OF BADEN, PENNSYLVANIA, ASSIGNOR TO NATIONAL METAL MOLDING COMPANY, OF PITTSBURGH, PENNSYLVANIA, A CORPORATION OF PENNSYLVANIA.

MANUFACTURE OF FLEXIBLE METALLIC TUBING, ARMORED CABLE, AND LIKE PRODUCTS.

Application filed March 14, 1922. Serial No. 543,763.

*To all whom it may concern:*

Be it known that I, GEORGE E. PHILLIPS, a subject of the King of Great Britain, residing at Baden, in the county of Beaver and State of Pennsylvania, have invented or discovered certain new and useful Improvements in the Manufacture of Flexible Metallic Tubing, Armored Cable, and like Products, of which improvements the following is a specification.

It is the object of the invention to improve and simplify the manufacture of flexible metallic tubing, armored cable, and similar products by continuously bending into interengaging helical coils a suitably formed metallic strip or strips.

Although it will be understood that the new method of manufacture which constitutes the present invention is not restricted to the use of any particular machine for its practice, I have illustrated in the accompanying drawings one organization of mechanism suitable for that purpose. Figure 1 is a plan view of the machine. Figure 2 is a perspective view on an enlarged scale of the forming and feeding rolls, guide and coiler. Figure 3 is a cross-section on the line III—III, Figure 2. Figure 4 is a detail sectional view of the coiler and product of Figures 1 and 2, omitting the cable shown in Figure 1. Figure 5 shows conventionally the manufacture of "two-strip" armored cable, the cable in this case traveling vertically, instead of horizontally as in Figure 1. Figures 6 and 7 are detail sectional views respectively of the upper and lower coilers of Figure 5, the cable again being omitted.

The mechanism is supported in suitable framework. The main driving-shaft 1 has fast and loose pulleys 2, 3, connected by belt 4 with a suitable source of power, and carries a gear 5 meshing with a gear 6 secured to the hollow shaft 7. On the end of shaft 7 is mounted the frame 8 of the reel 9 carrying the cable 10 to be armored. Frame 8 has at its outer end a stub-shaft 11 rotatably supported in a bearing 12. The reel-frame and reel are thus rotated around the axis of the hollow shaft 7.

The driving-shaft 1 also has secured to it the gear 13, which meshes with the gear 14 secured to the shaft 15 of the upper forming and feeding roll 16, the lower cooperating roll 17 (Figure 2) being secured to the shaft 18, the latter having a gear (not shown) meshing with the gear 14, so that the cooperating rolls 16 and 17 are driven in opposite directions and at the same speed. The connections are also so proportioned that the speed of rotation of the reel-frame 8 about the axis of shaft 7 will be the same as the rate of travel of the strip which is applied to the cable.

The flat steel strip 19 is drawn continuously from a reel into the pass between the driven rolls 16 and 17. These rolls act to partially shape the strip by cross-sectionally curving one portion 20 while its other portion 21 remains flat, as shown in Figure 3, and they also feed or drive it forwardly, first through the suitably shaped channel 22 in the bifurcated guide 23, and thence to the coiler 24 to be now described.

The coiler 24 is of a general hook shape, as shown in Figure 2, having a straight shank 25 and a curved portion 26 which, as shown, is of an extent less than a complete circle. This curved portion 26 of the hook is also inclined angularly of its axis, as is best shown in Figure 4, so as to give it a helical form corresponding to the pitch to be given to the coils of the product. The strip 19 is driven from the inner end of the guide 23 so that its unbent portion 21 comes into contact with the inner wall of the coiler 24, while the bend in its curved portion bears against the corner of the coiler and serves to guide the strip around the curved portion 26 of the coiler. Thus under the compressive strain the successive coils are continuously formed, and in their formation they are given their final permanent set.

I have found that in the "single-strip"

practice thus far being described the width of the inner wall of the coiler may advantageously be less than that of the flat portion of the strip, so that the flat portion 21 of the strip will project beyond the edge of the coiler. This not only tends to lessen friction and the heat thereby generated, but it has the important advantage that in the formation of the coils by the method described the unconfined edge portion of the strip will automatically curve outwardly in the direction opposite to the curvature given to the portion 20 of the strip by the rolls 16, 17. The strip is thus brought to the desired cross-sectional form, as shown in Figure 4, and the overlapping edges of the successive coils will interengage in the manner well-known in the art.

The manufacture of armored cable is shown in Figure 1, and because the operation of forming the coils causes the product to rotate axially, axial rotation is imparted to the unarmored cable by the means already described. The unarmored cable is drawn from the reel 9 through the bore of the hollow shaft 7, and thence through the curved orifice in the coiler, where the successive metallic coils as formed are caused to bind upon and tightly grasp the cable. The operation of thus armoring the cable serves to draw the unarmored cable continuously from the reel and to push the finished product continuously away.

The product may be taken up by any suitable means which will rotate around the axis of the product while at the same time it will receive the product coming to it longitudinally. Suitable means for this purpose is shown and described in Letters Patent No. 630,502.

It is of course to be understood that by duplicating the forming and feeding rolls, the guide and the coiler, armored cable and tubing may be manufactured in two strips as shown and described in the patent last above referred to. In that case each pair of bending rolls 116, 117, and 118, 119 will be so shaped as to bend the strips to the respective forms shown in Figure 7. The inner strip 30 will be coiled with its concave face turned outwardly and the outer strip 31 coiled with its concave face turned inwardly and bridging the edges of the successive convolutions of the inner strip. The guides and the bending walls of the coilers will be shaped to conform to the shape given to the strips.

Also by a further modification of the parts above named a four-strip armored cable or a four-strip conduit can be made as shown in Letters Patent No. 1,004,644.

The advantage of bending the successive convolutions of the metallic strip or strips by compressive contact with a helical surface of extent less than a complete circle with respect to its axis will be obvious to those skilled in the art. The operation greatly lessens the friction and heat characteristic of the operation described in said Letters Patent No. 630,502, and in the case of single-strip armor or conduit this advantage is increased through my new method of only partially forming the strip cross-sectionally in the rolls 16, 17, and completing its cross-sectional formation in the coiler.

An additional advantage is found in the fact that the operation of longitudinally bending the strip or strips into helical form is visible, and if inequalities occur they can readily be detected and corrected. Thus the invention is to be further distinguished from that described in the Letters Patent No. 630,502, above referred to.

In Letters Patent No. 630,503, the companion to the one last above named, for method of manufacture of flexible metallic conduit, armored cables, etc., in that portion of said method where a single strip is used the successive convolutions are not made to overlap or interengage each with the other, but are merely coiled side by side.

I claim as my invention:

1. In the manufacture of flexible metallic tubing, etc., the step which consists in impelling a strip of metal forwardly into contact with a fixed surface of helical form but of extent less than a complete circle with respect to its axis, and thereby converting the strip into a series of helical coils.

2. In the manufacture of flexible metallic tubing, etc., the step which consists in forcing a strip of metal for a portion only of its width into contact with a surface of helical form, and thereby cross-sectionally bending a marginal portion of the strip, and forming the strip longitudinally into a succession of interengaging coils.

3. The method of manufacture of flexible metallic tubing, etc., which includes the combined steps of partially shaping a strip of metal cross-sectionally and impelling it forwardly into contact with a surface of helical form, and by means of such contact completing the cross-sectional shaping of the strip and converting it into a series of interengaging helical coils.

4. The method of manufacture of flexible metallic tubing etc., which consists in simultaneously shaping a strip of metal cross-sectionally and die-bending it longitudinally into a series of interengaging helical coils.

5. The method of manufacture of flexible metallic tubing etc., consisting in cross-sectionally bending a single strip of metal and impelling it forwardly into contact for a portion only of its width with a surface of helical form and thereby converting the strip into a series of interengaging helical coils.

6. The method of manufacture of flexible metallic tubing etc., which includes the combined steps of shaping cross-sectionally a strip of metal and impelling it into contact with a fixed surface of helical form, thereby converting the strip into a series of helical coils and directing the coils vertically away from said surface.

In testimony whereof I have hereunto set my hand.

GEORGE E. PHILLIPS.

Witnesses:
H. M. TALLMAN,
CLARENCE RENSHAW.